US012669225B2

(12) United States Patent
Deng

(10) Patent No.: US 12,669,225 B2
(45) Date of Patent: Jun. 30, 2026

(54) THREE-WIRE FLAT CABLE HIGH-VOLTAGE PLUG-IN LIGHT STRING AND METHOD OF MAKING THEREOF

(71) Applicant: DONGGUAN YONGFENG LIGHT CO., LTD, Dongguan City (CN)

(72) Inventor: Zhumei Deng, Dongguan (CN)

(73) Assignee: Dongguan Yongfeng Lighting Co., Ltd, Dongguan City (CN)

( * ) Notice: Subject to any disclaimer, the term of this patent is extended or adjusted under 35 U.S.C. 154(b) by 0 days.

(21) Appl. No.: 18/929,586

(22) Filed: Oct. 28, 2024

(65) Prior Publication Data

US 2026/0117944 A1 Apr. 30, 2026

(51) Int. Cl.

| | |
|---|---|
| ***F21S 4/10*** | (2016.01) |
| ***F21V 19/00*** | (2006.01) |
| ***F21V 31/00*** | (2006.01) |
| ***F21Y 103/10*** | (2016.01) |
| ***F21Y 115/10*** | (2016.01) |

(52) U.S. Cl.

CPC ............ *F21S 4/10* (2016.01); *F21V 19/0025* (2013.01); *F21V 31/005* (2013.01); *F21Y 2103/10* (2016.08); *F21Y 2115/10* (2016.08)

(58) Field of Classification Search

CPC ...... F21S 4/10; F21V 19/0025; F21V 31/005; F21Y 2103/10; F21Y 2115/10

See application file for complete search history.

(56) References Cited

U.S. PATENT DOCUMENTS

| | | | | |
|---|---|---|---|---|
| 4,899,266 | A * | 2/1990 | Ahroni | F21S 4/10 362/249.14 |
| 5,622,425 | A * | 4/1997 | Lin | F21V 21/002 362/249.14 |
| 8,567,992 | B2 * | 10/2013 | Lo | H05B 47/18 362/267 |
| 8,827,728 | B1 * | 9/2014 | Lin | F21S 4/10 439/168 |
| 9,655,211 | B2 * | 5/2017 | Altamura | G06F 3/048 |
| 10,568,172 | B2 | 2/2020 | Li et al. | |
| 10,950,585 | B2 | 3/2021 | Li et al. | |
| 11,506,362 | B1 * | 11/2022 | Wang | F21S 4/10 |
| 11,953,191 | B1 * | 4/2024 | Lam | F21K 9/90 |
| 12,055,275 | B1 * | 8/2024 | Zou | F21S 4/10 |
| 12,338,959 | B1 * | 6/2025 | Chen | F21V 31/005 |
| 2004/0115984 | A1 * | 6/2004 | Rudy | F21S 4/10 439/405 |
| 2010/0226126 | A1 * | 9/2010 | Naito | H05K 1/189 362/235 |
| 2012/0217862 | A1 | 8/2012 | Matsuda et al. | |

(Continued)

*Primary Examiner* — Tsion Tumebo

(74) *Attorney, Agent, or Firm* — Enable IP, P.C.

(57) ABSTRACT

A method of making a light string is disclosed. The method includes: providing a three-wire flat cable comprising a middle wire between two outer wires; cutting the middle wire at a first place to expose a first end and a second end of the middle wire; connecting a light source to the exposed first end and second end of the middle wire; inserting a tail cover of a lamp holder to protect the exposed first end and second end of the middle wire; wrapping the light source in a heat shrink tube to waterproof the light source; securing a lamp head on the tail section of the lamp holder; and attaching a decorative shell to the lamp head.

7 Claims, 16 Drawing Sheets

(56) References Cited

U.S. PATENT DOCUMENTS

| | | | | |
|---|---|---|---|---|
| 2014/0355277 | A1* | 12/2014 | Lin | H01R 33/09<br>362/391 |
| 2015/0003039 | A1 | 1/2015 | Liu et al. | |
| 2017/0167663 | A1 | 6/2017 | Hsiao et al. | |
| 2017/0363273 | A1* | 12/2017 | Chen | F21V 17/16 |
| 2018/0372278 | A1* | 12/2018 | Zhang | F21K 9/237 |
| 2021/0140623 | A1* | 5/2021 | Yu | F21S 4/10 |
| 2024/0110694 | A1* | 4/2024 | Lam | F21V 31/04 |

* cited by examiner

THREE-WIRE FLAT CABLE HIGH-VOLTAGE PLUG-IN LIGHT STRING AND METHOD OF MAKING THEREOF

FIELD

This relates to light strings, and more particularly, to a three-wire flat cable high-voltage plug-in light string and the method of making thereof.

BACKGROUND

Traditional processes of making light strings include a step of twisting the wires, which can add to the complexity and cost of the processes.

SUMMARY

In one aspect, this disclosure relates to a three-wire flat cable high-voltage plug-in light string. In another aspect, the disclosure relates to a method of making such three-wire flat cable high-voltage plug-in light string.

DETAILED DESCRIPTION

Embodiments of the present disclosure will be described below in conjunction with the accompanying drawings, but it should be appreciated by those skilled in the art that the embodiments described below are exemplary, rather than exhaustive. They are only used to illustrate the present disclosure and should not be regarded as limiting the scope of the present disclosure. All other embodiments obtained by those of ordinary skill in the art without creative efforts based on the embodiments disclosed herein shall fall within the scope of the present disclosure.

This disclosure relates to three-wire flat cable high-voltage plug-in light strings and the processes of making thereof.

Figure 1:
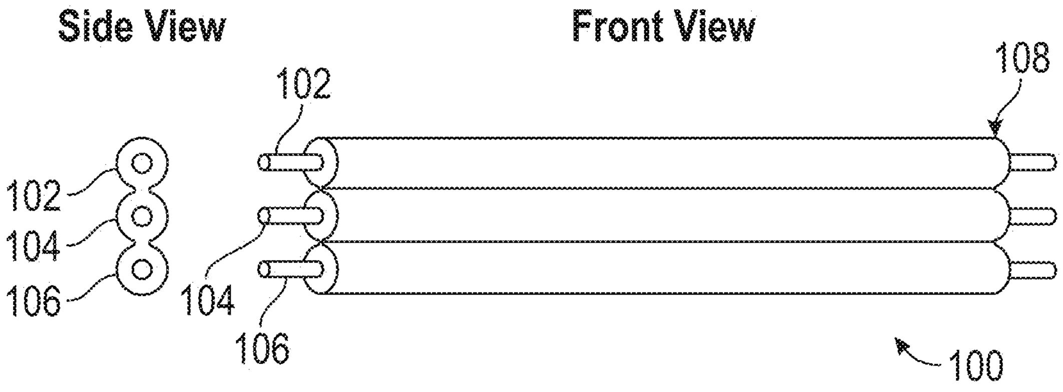
FIGS. 1-25 illustrate the exemplary steps in manufacturing three-wire flat cable high-voltage plug-in light strings, according to embodiments of the disclosure.

FIG. 1 illustrates an exemplary three-wire flat cable 100. The flat cable 100 includes 3 copper wires 102, 104, 106. The copper wires can be covered by and insulated from each other by an insulation layer 108. The insulation layer can be made or Polyvinyl Chloride (PVC) or any other suitable material.

Figure 2:
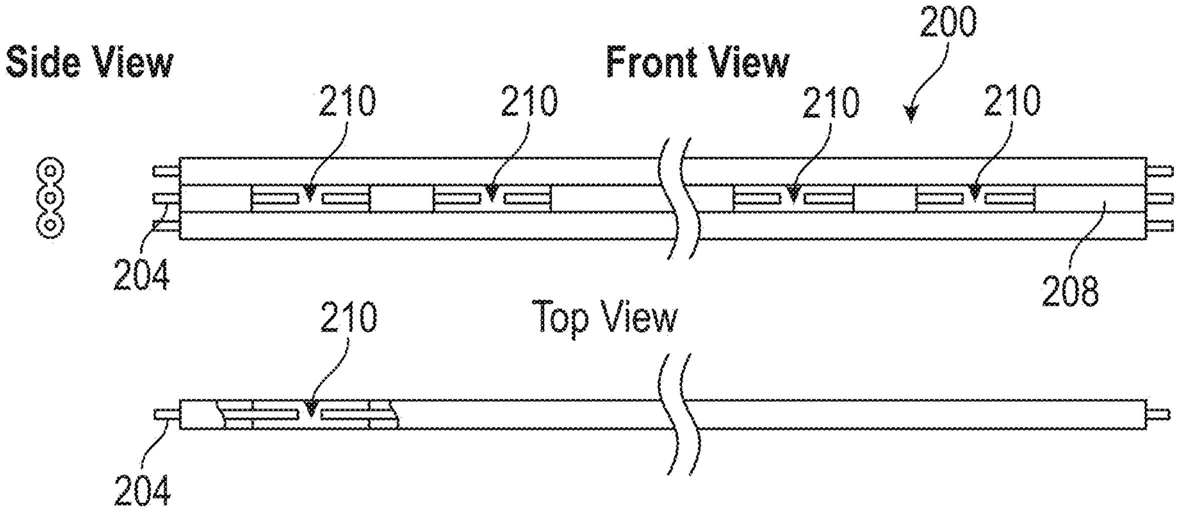

First, as illustrated in the various views of FIG. 2, part of the insulation (e.g., PVC) layer 208 is removed from the middle wire 204 of the three-wire cable 200. The middle wire 204 is also cut in one or more places 210.

Figure 3:
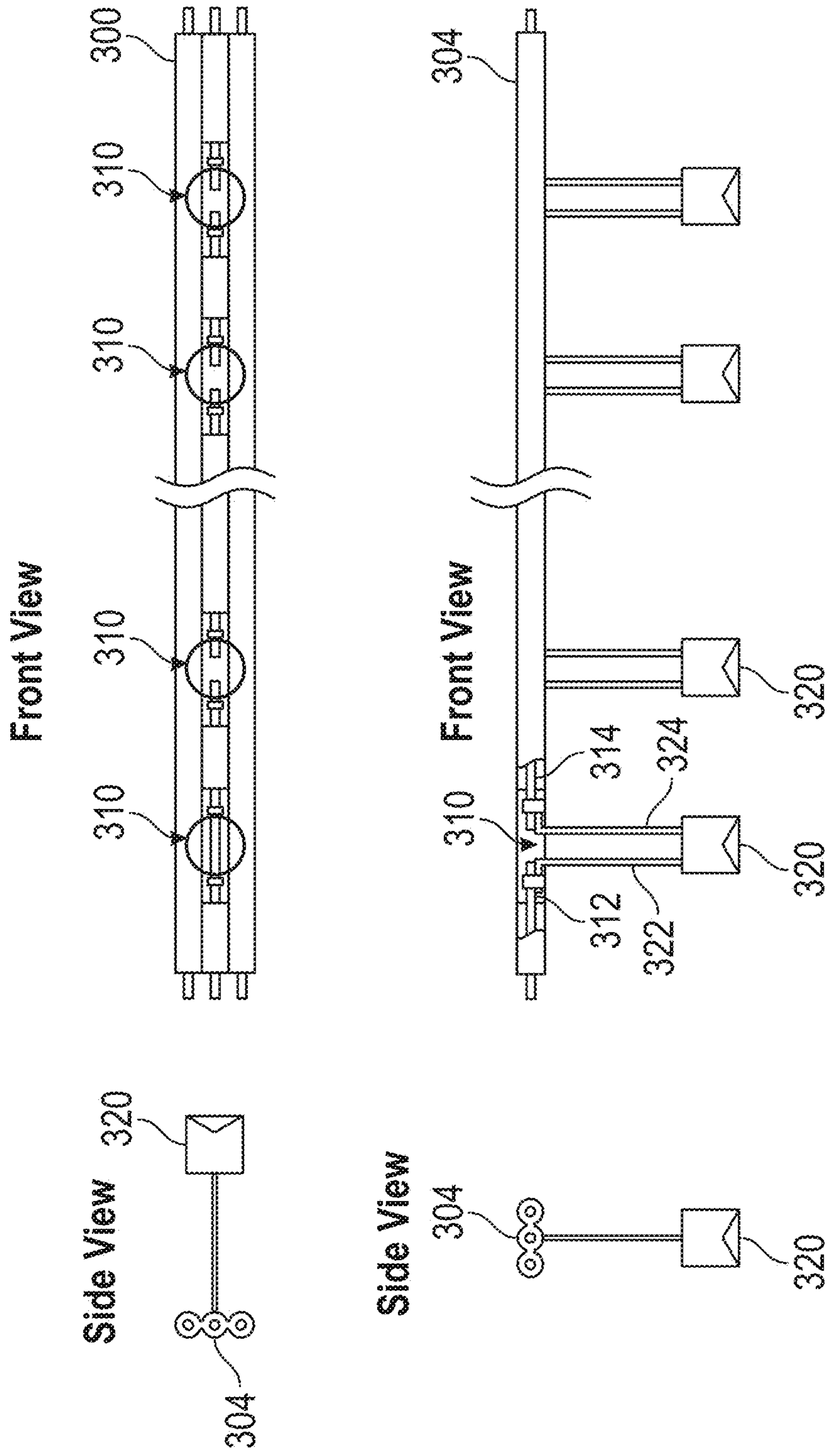

Next, as shown in FIG. 3, the two legs 322, 324 of a light emitting diode (LED) 320 can be connected to the two exposed ends 312, 314 of the middle wire 304 at a place where the middle wire 304 is cut in the previous step. The two legs 322, 324 of the LED 320 can be bent so that they can be welded or riveted to the exposed ends 312, 314 of the middle wire 304. As shown in the figure, multiple LEDs 320 can be connected to the middle wire 304 at the various places 310 where the middle wire 304 is cut.

Figure 4:
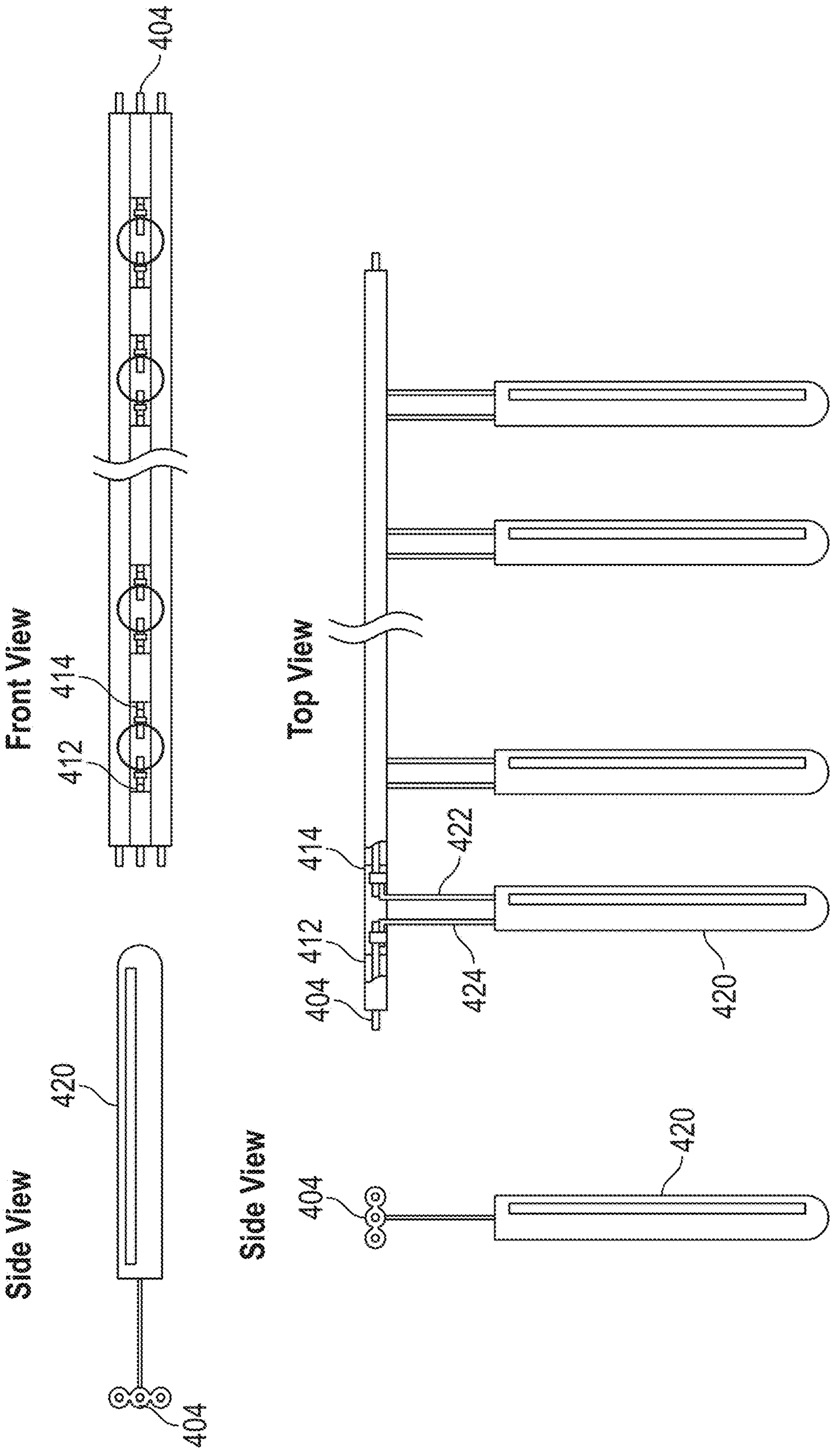

The same step illustrated in FIG. 3 can be used for connecting one or more filament strip LEDs to the middle wire of the three-wire flat cable, as illustrated in FIG. 4. In the illustrated example, the two legs 422, 424 of each filament strip LED 420 can be bent so that they can be welded or riveted (or connected by other suitable means) to the two exposed ends 412, 414 of the middle wire 404 at a place where the middle wire 404 is exposed and cut.

Figure 5:
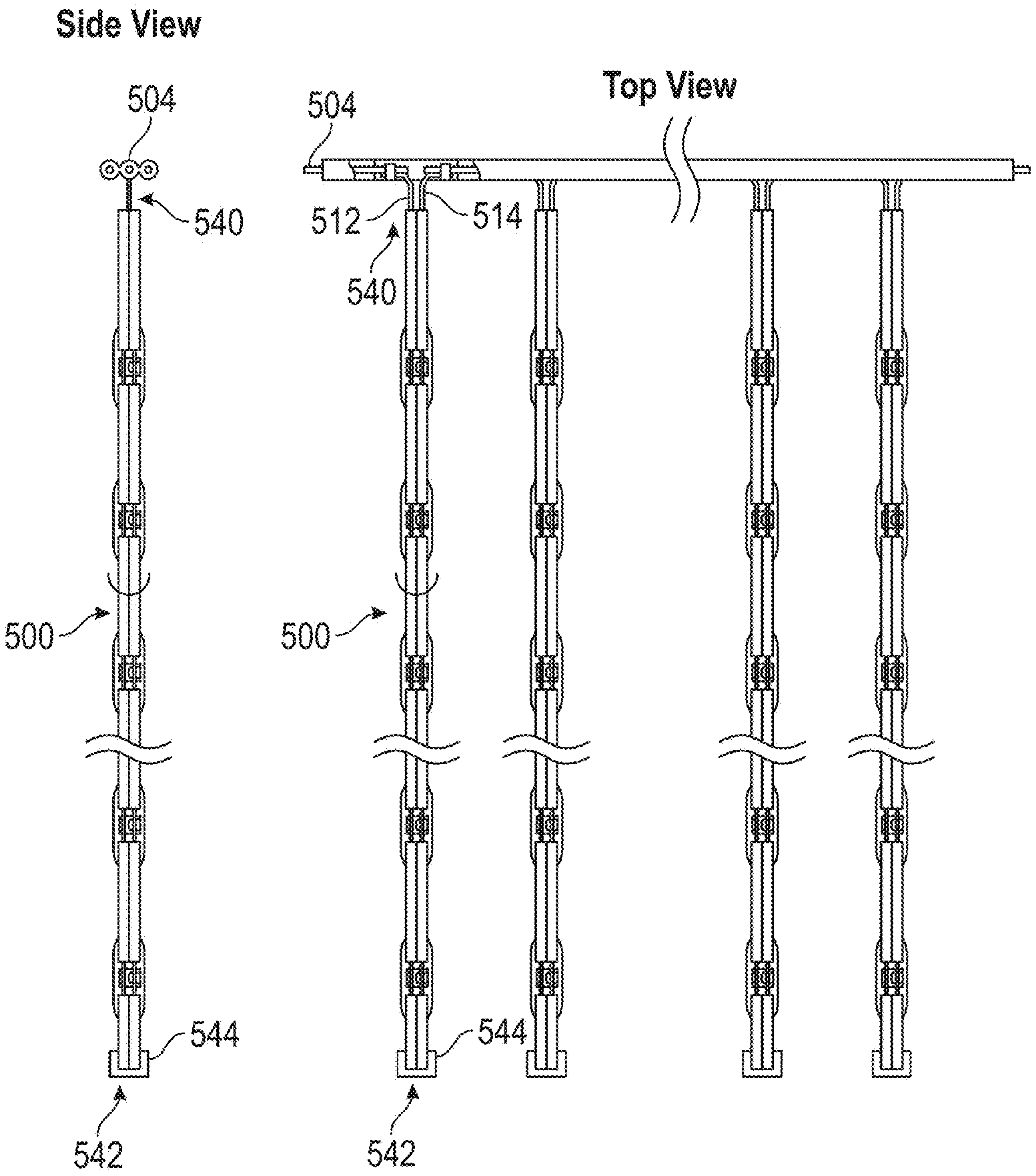

FIG. 5 illustrates another embodiment, in which a two-wire Surface Mount Device (SMD) light string with multiple SMD LEDs connected in parallel is connected to the middle wire of a three-wire flat cable in a similar fashion as discussed above with reference to FIGS. 3 and 4. As shown in FIG. 5, one end 540 of the two-wire SMD LED slight string 500 can be striped of the insulation wrap to expose 2 copper wires 512, 514. The exposed copper wires 512, 514 can be connected, respectively, by welding or riveting or any other suitable means to the two exposed ends of the middle wire 504 of the three-wire flat cable at a place where the middle wire 504 is cut. The other end 542 of the two-wire SMD LED light string 500 can be sealed by overholding 544 to protect the copper wires from being exposed. As shown in FIG. 5, multiple two-wired SMD LED light strings can be connected to the same three-wire flat cable at places where the three-wire flat cable is cut to expose the middle copper wire 504.

FIGS. 3-5 illustrate various embodiments of the disclosure, in which different types of lights or light strings can be connected to a three-wire flat cable in the same way discussed above.

Figure 6:
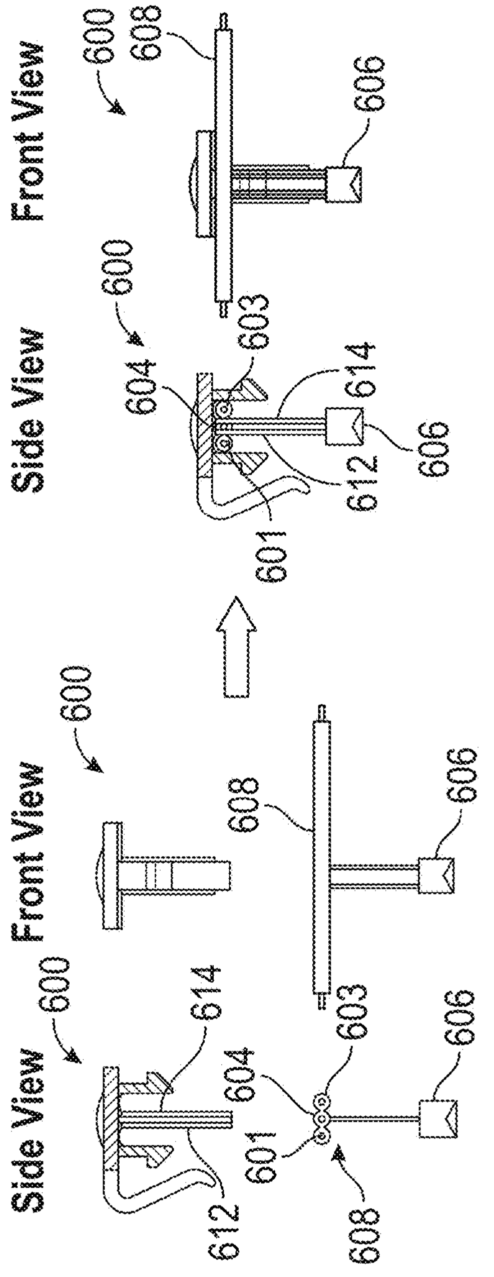

The steps illustrated in FIGS. 6-9 and discussed in the following paragraphs follow the step shown in FIG. 3. FIG. 6 illustrates the step following the step illustrated in FIG. 3. In this step, the tail cover 600 of a lamp holder is placed over the flat surface of the three-wire flat cable 608 over the space where the middle wire 604 of the three-wire flat cable 608 is exposed and cut. The tail cover 600 includes two parallel pieces 612, 614 that can be inserted through the exposed section of the three-wire flat cable with each of the parallel pieces 612, 614 inserted between the exposed middle wire 604 and one of the outside wires 601, 603. In this example, the parallel pieces 612, 614 can extend to LED 606 that is connected to the three-wire flat cable 608. The step illustrated in FIG. 6 can be done with multiple tail covers over multiple exposed sections of the three-wire flat cable 608.

Figure 7:
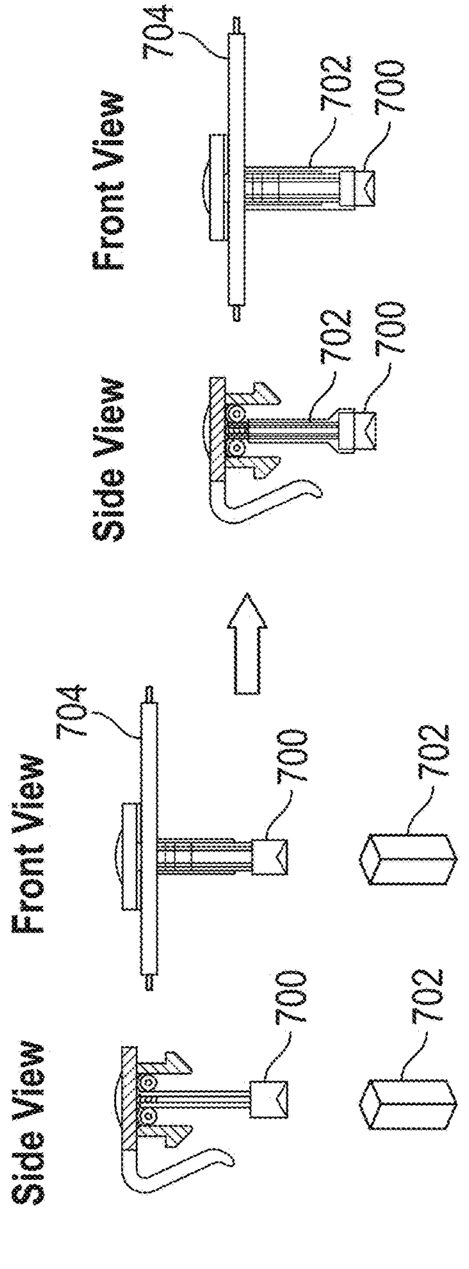

After the tail cover is inserted over the three-wire flat cable, a heat shrink tube 702 can cover each LED 700 connected to the three-wire cable 704, as illustrated in FIG. 7. The heat shrink tube can protect and waterproof the LED 700.

Figure 8:
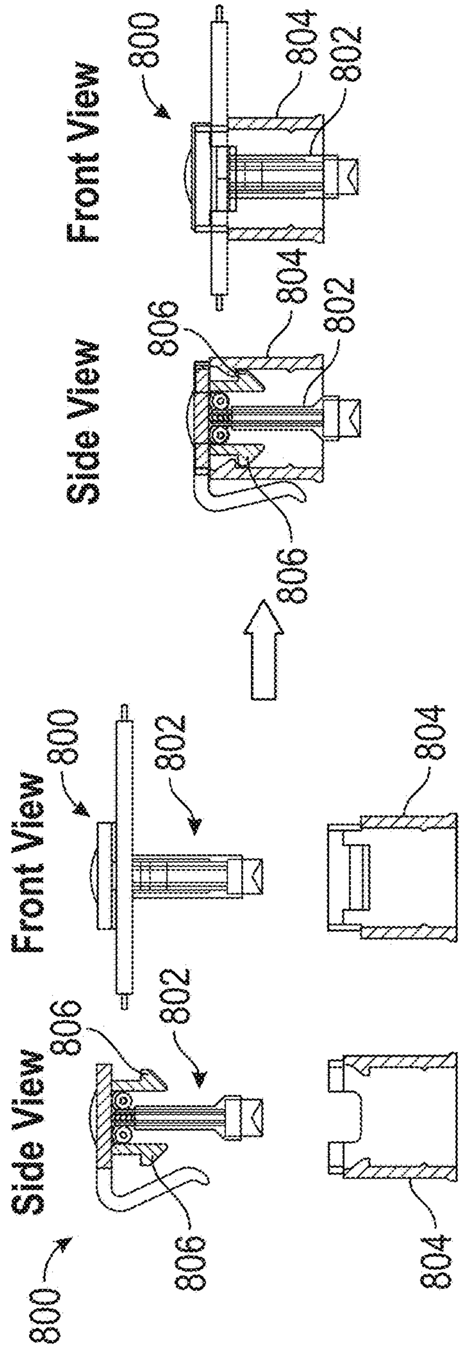

Next, as illustrated in FIG. 8, a lamp head 804 can be placed over the LED assembly 802 from the previous step. The tail cover 800 can include a hook-shaped part 806 than can hold the lamp head 804 to secure the position of the LED assembly 802.

Figure 9:
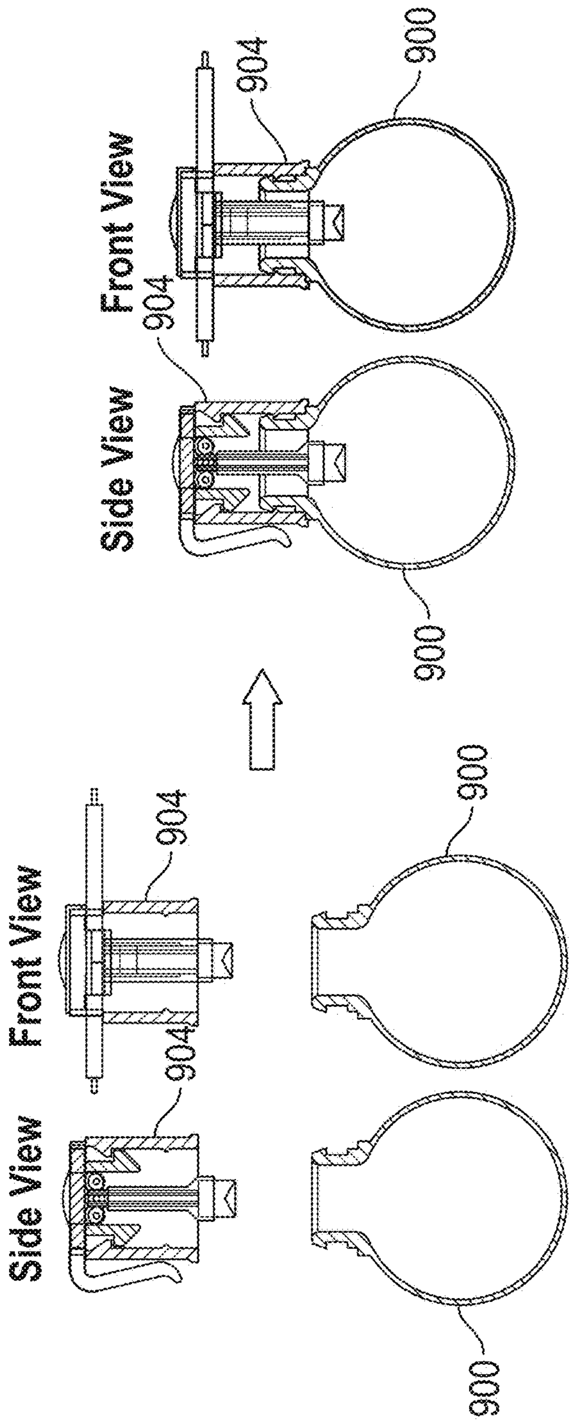

A decorative shell 900 can be assembled onto the lamp head 904, as illustrated in FIG. 9.

Figure 10:
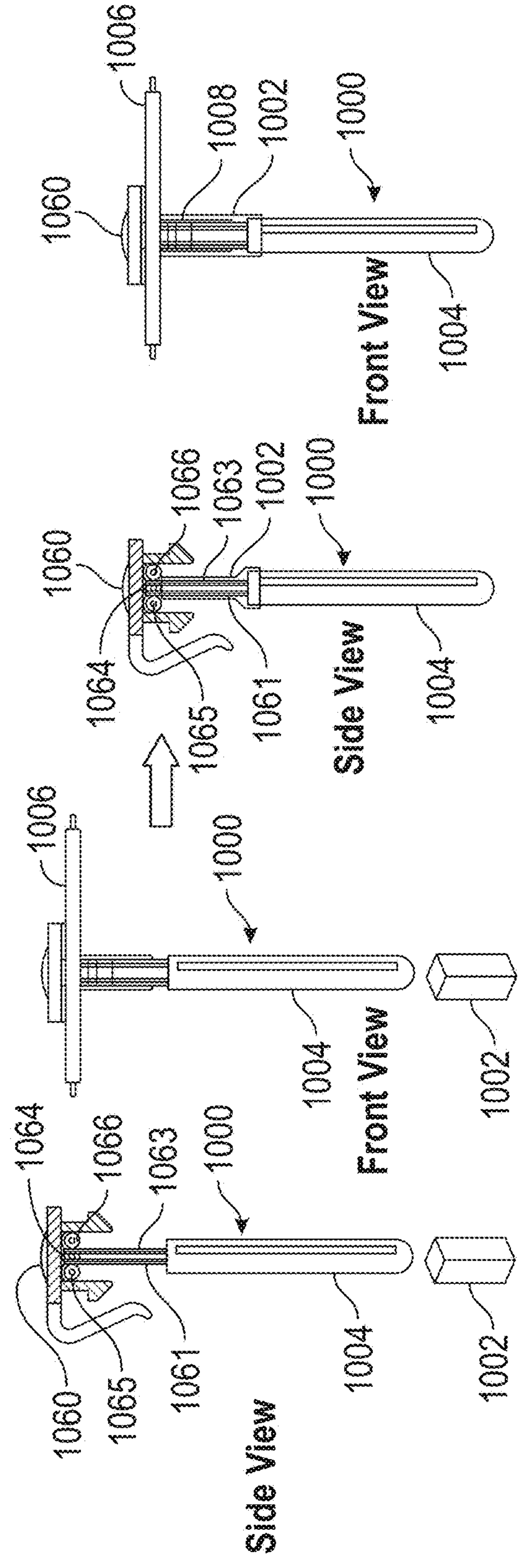

The steps illustrated in FIGS. 10-13 follow the step shown in FIG. 4. FIG. 10 illustrates the assembly 1000 of FIG. 4. The assembly 1000 includes a filament LED 1004 connected to a three-wire flat cable 1006. In this step, the tail cover 1060 of a lamp holder is placed over the flat surface of the three-wire flat cable 1006 over the space where the middle wire 1064 of the three-wire flat cable 1006 is exposed and cut. The tail cover 1060 includes two parallel pieces 1061, 1063 that can be inserted through the exposed section of the three-wire flat cable with each of the parallel pieces 1061, 1063 inserted between the exposed middle wire 1064 and one of the outside wires 1065, 1066. In this example, the parallel pieces 1061, 1063 can extend to the filament LED 1004 that is connected to the three-wire flat cable 1006.

In addition, a heat shrink tube 1002 can wrap part of the assembly 1000. Specifically, as shown in FIG. 10, the heat shrink tube 1002 can wrap around the leg portion 1008 of the filament LED 1004 to protect it and waterproof part or the whole assembly 1000. The step illustrated in FIG. 10 can be carried out on multiple filament LEDs connected to a three-wire flat cable.

Figure 11:
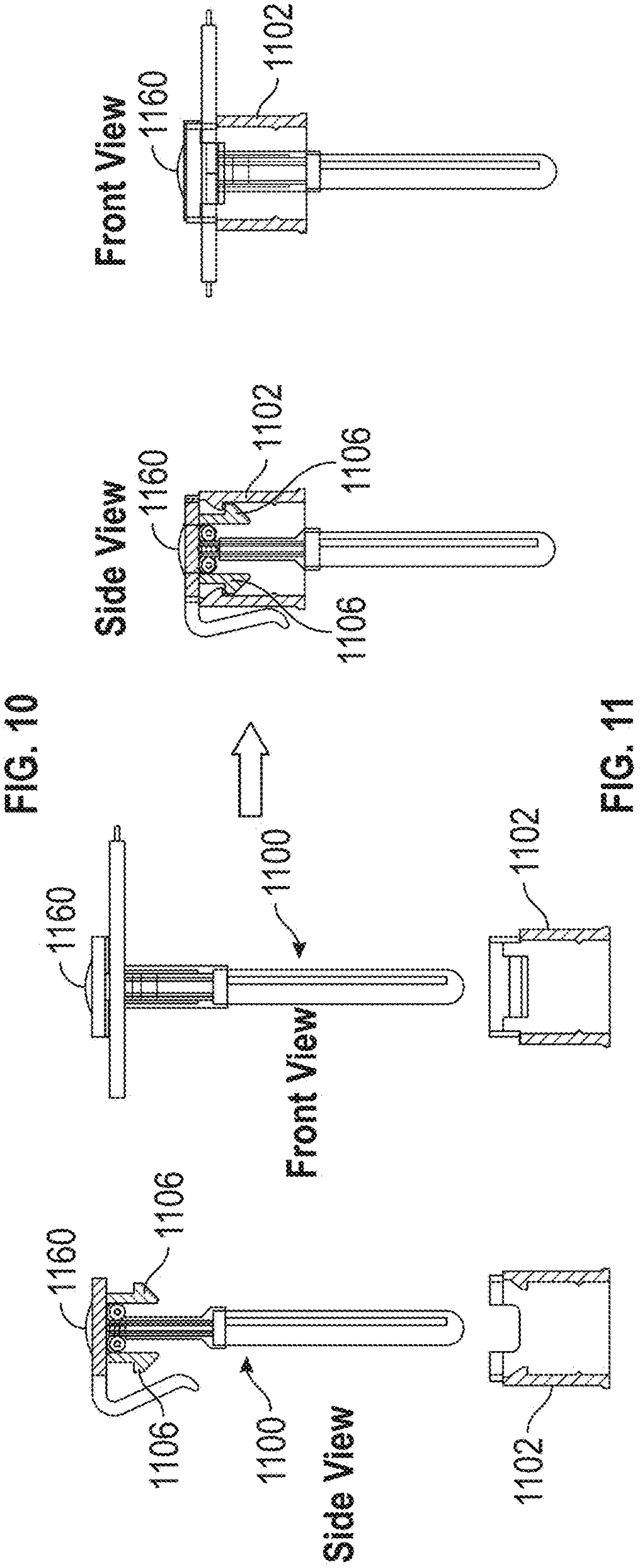

Next, as illustrated in FIG. 11, a lamp head 1102 can be fitted onto the assembly 1100 of FIG. 10. The tail cover 1160 can include a hook-shaped part 1106 than can hold the lamp head 1102 to secure the position of the filament LED assembly 1100.

Figure 12:
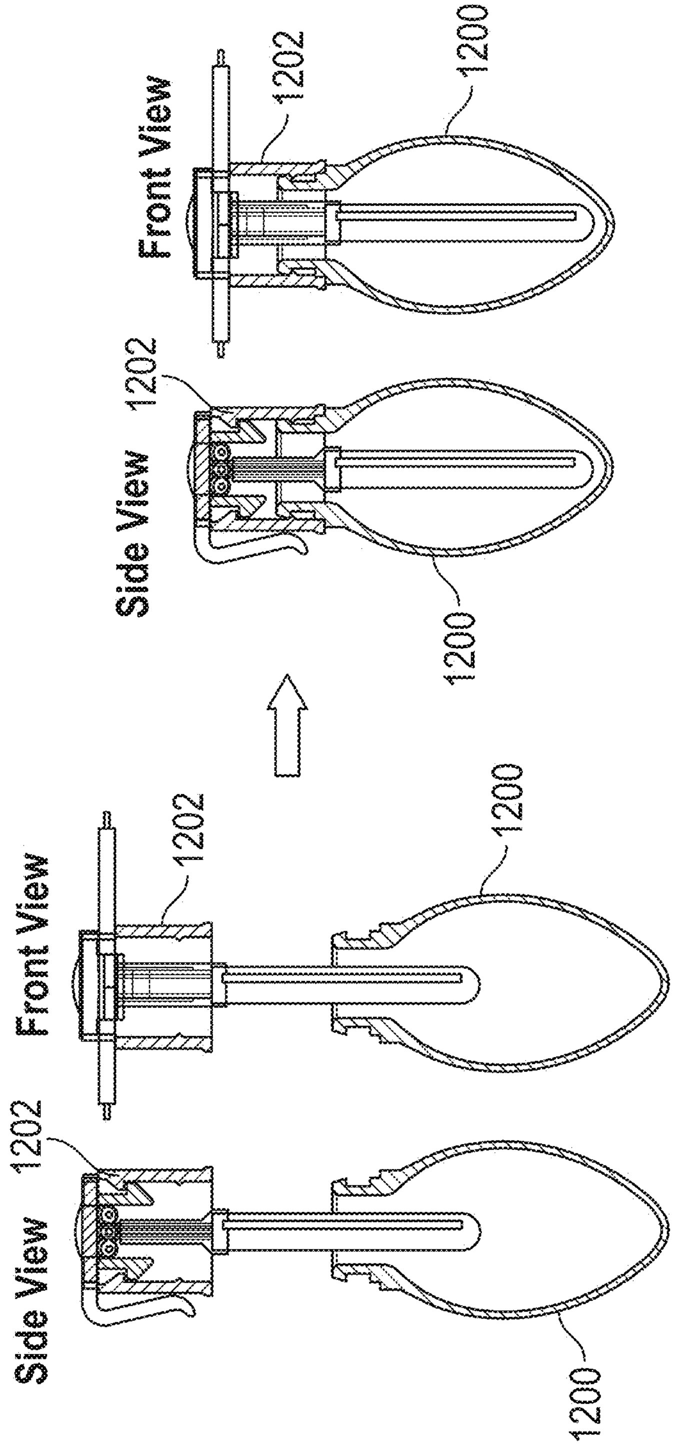

As shown in FIG. 12, a decorative shell 1200 can be assembled onto the lamp head 1202, as illustrated in FIG. 12. The decorative shell 1200 can be of any shape or color.

Figure 13:
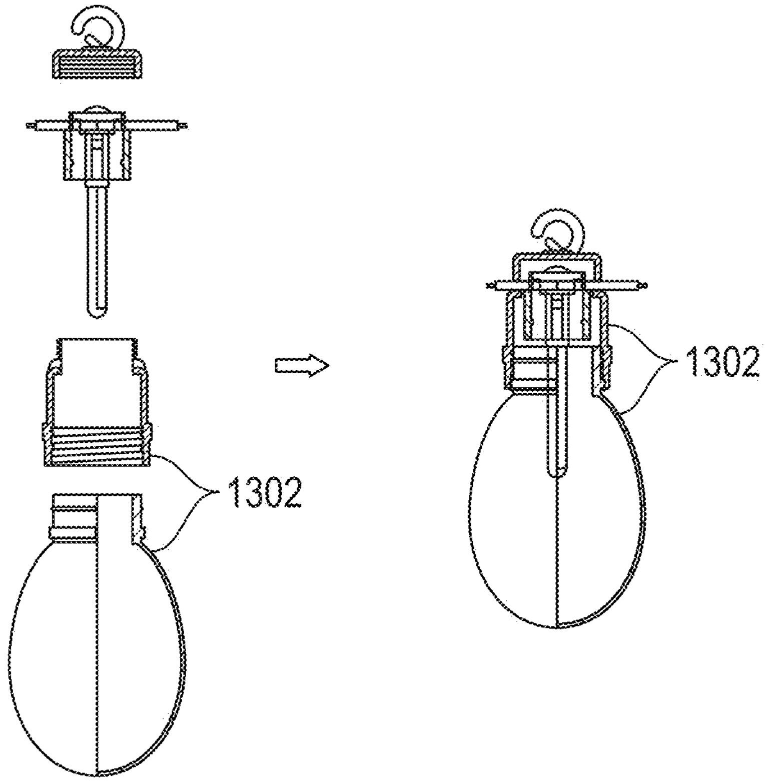

Alternatively and additionally, as shown in FIG. 13, a fake lamp head decorative shell 1302 can be added to create additional effects.

FIGS. 14-18 illustrate alternative embodiments. The embodiment of FIG. 14 also has an LED 1401 connected to a three-wire flat cable 1403. In this embodiment, an inner plug 1400 is inserted into the spaces between the exposed cut middle wire 1404 and the outer wires 1402, 1406 of the three-wire flat cable 1403. The inner plug 1400 serves the same purpose (e.g., supporting and isolating the two legs of the LED) as the tail cover of the lamp holder in the previous embodiments (e.g., FIG. 6).

Figure 14:
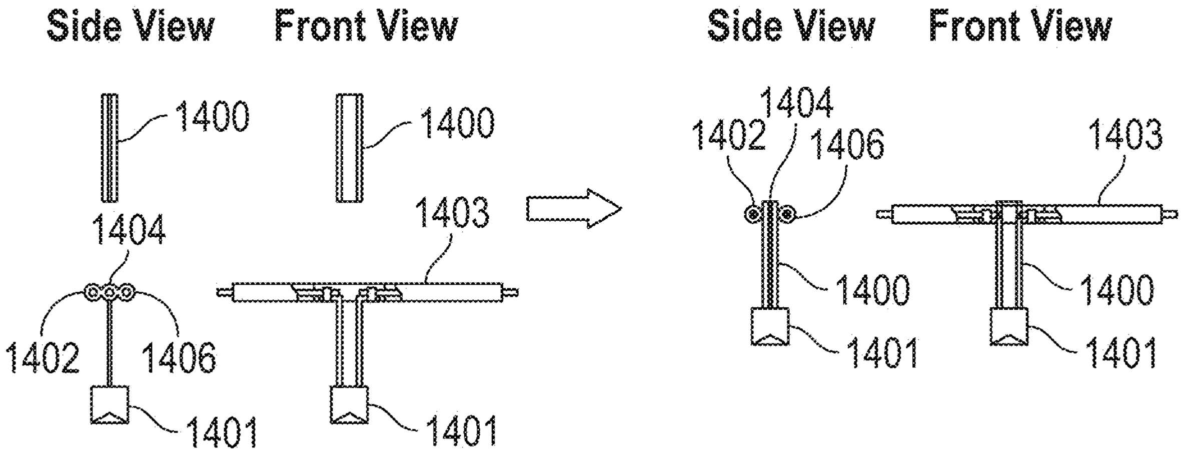
Figure 15:
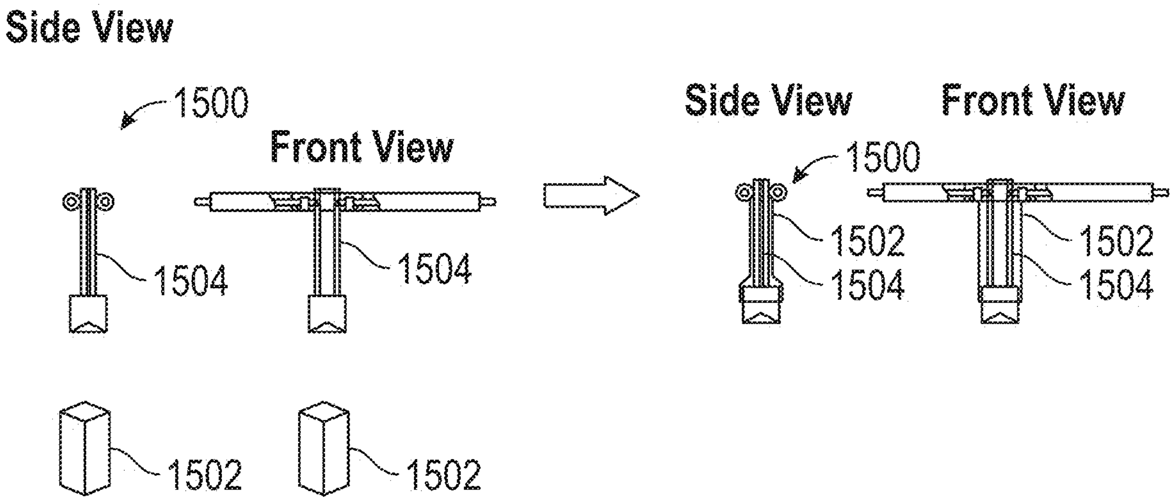

As shown in FIG. 15, a heat shrink tube 1502 can be added to the assembly 1500 of FIG. 14. The heat shrink tube 1502 can wrap around the inner plug 1504 to protect and waterproof the assembly 1500.

Figure 16:
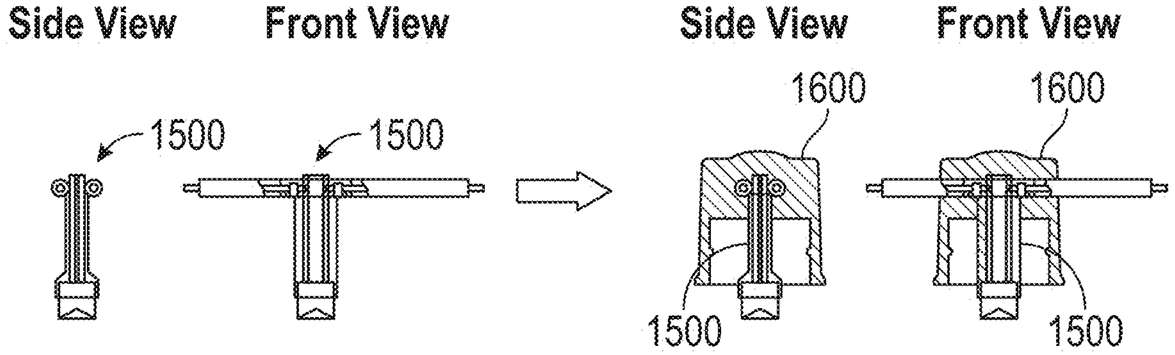
Figure 17:
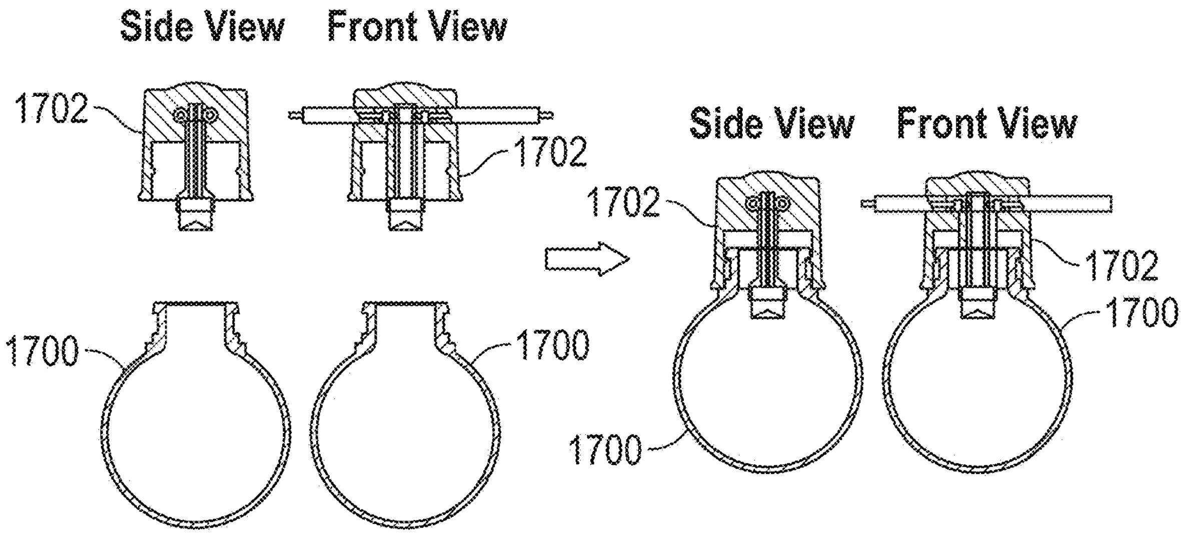

Next, as shown in FIG. 16, a lamp holder 1600 can be overmolded directly on the assembly 1500 of FIG. 15. As illustrated in FIG. 17, a decorative shell 1700 can be added to create certain effects. The decorative shell 1700 can be of any shape and color, and can be locked into the lamp holder 1702 of the assembly. The lamp holder 1702 can be made of plastic or other suitable material.

Figure 18:
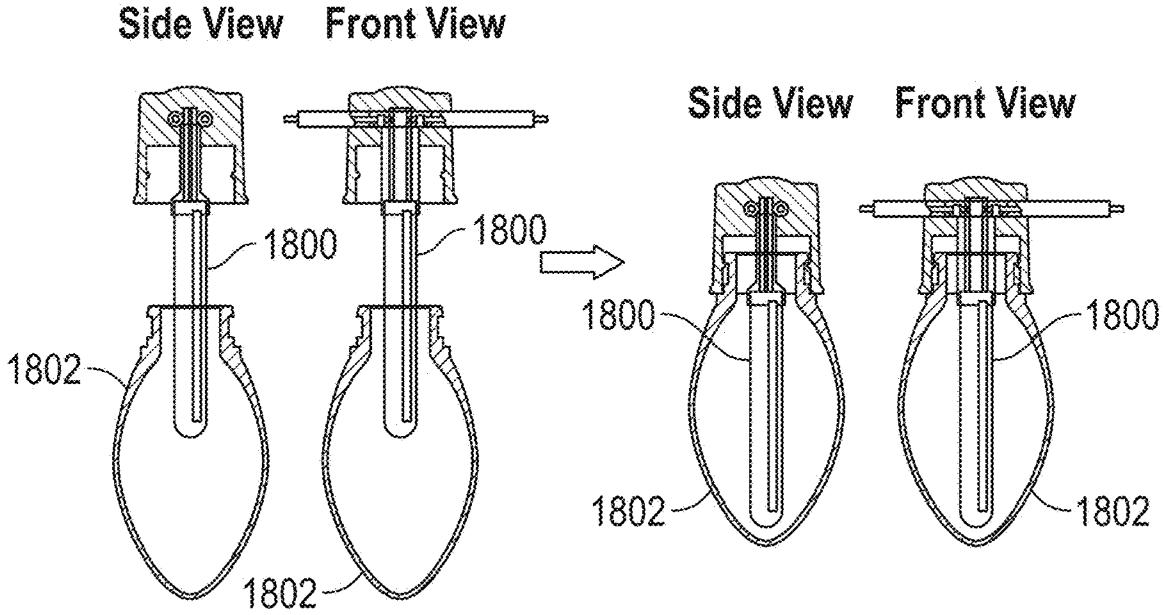

The embodiment illustrated in FIG. 18 replaces the LED of FIGS. 14-17 with a long filament LED 1800 and have a different decorative shell 1802 than the one shown in FIG. 17.

Figure 19:
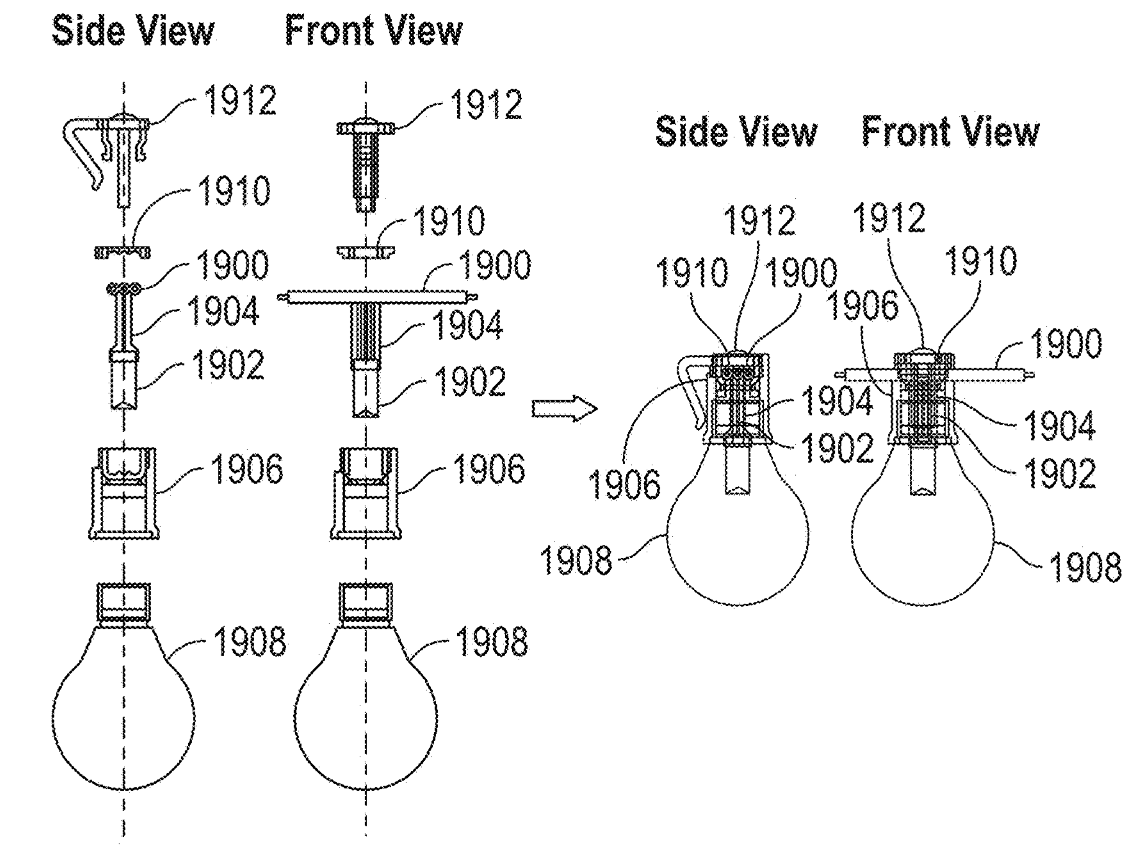

FIG. 19 illustrates a different embodiment of the disclosure. As shown in the figure, an LED 1902 can be connected to a three-wire flat cable 1900, and a heat shrink tube 1904, a lamp head 1906, and a decorative shell 1908 can be added to the assembly in the same fashion as discussed in the previous embodiments. In this embodiment, a waterproof accessory 1910 can be added inside the lamp head 1906 between a flat surface of the three-wire flat cable 1900 and the tail piece 1912 of the lamp head 1906 to achieve waterproof effect. The waterproof accessory 1910 can be made of silicon or any other suitable material.

Figure 20:
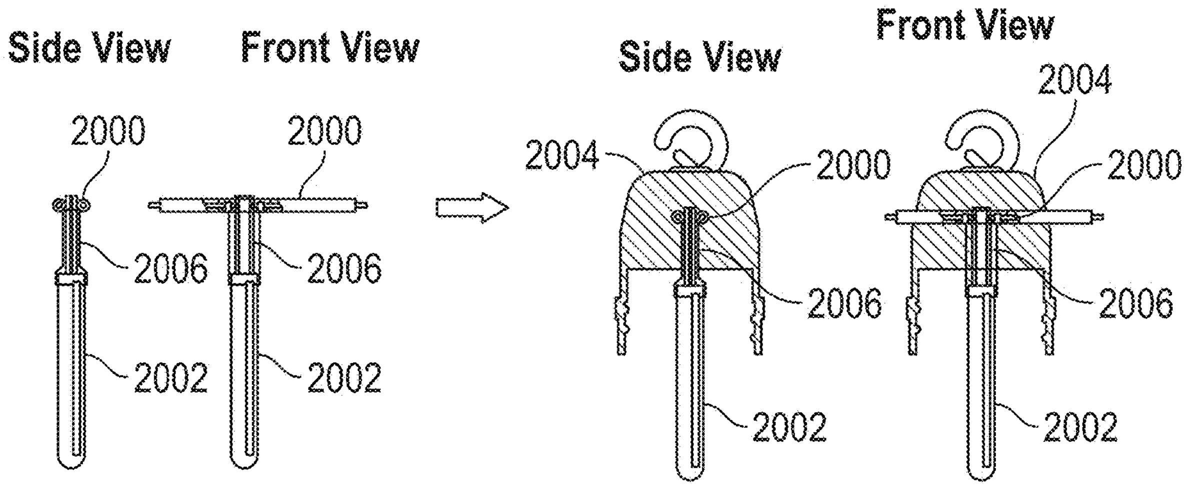
Figure 21:
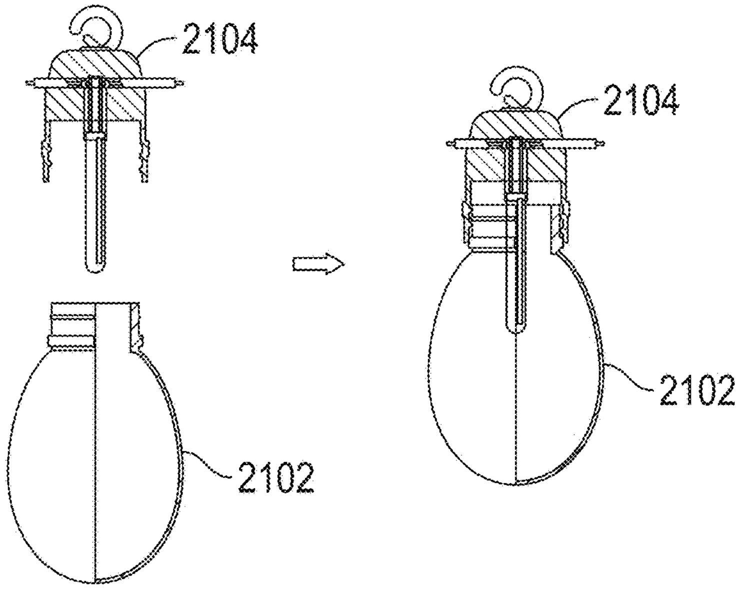

FIGS. 20 and 21 illustrates another embodiment of the disclosure. In this embodiment, as shown in FIG. 20. A filament LED 2002 is attached to a three-wired flat cable 2000 in the same fashion as discussed in the previous embodiments. A lamp holder 2004 can be overmolded directly over the three-wired flat cable 2000 and at least a portion 2006 of the filament LED 2002. The lamp holder 2024 can be made of plastic or any other suitable material.

A decorative shell 2102 can then be assembled onto the lamp holder 2104, as illustrated in FIG. 21. The decorative shell 2102 can be of any shape or color.

Figure 22:
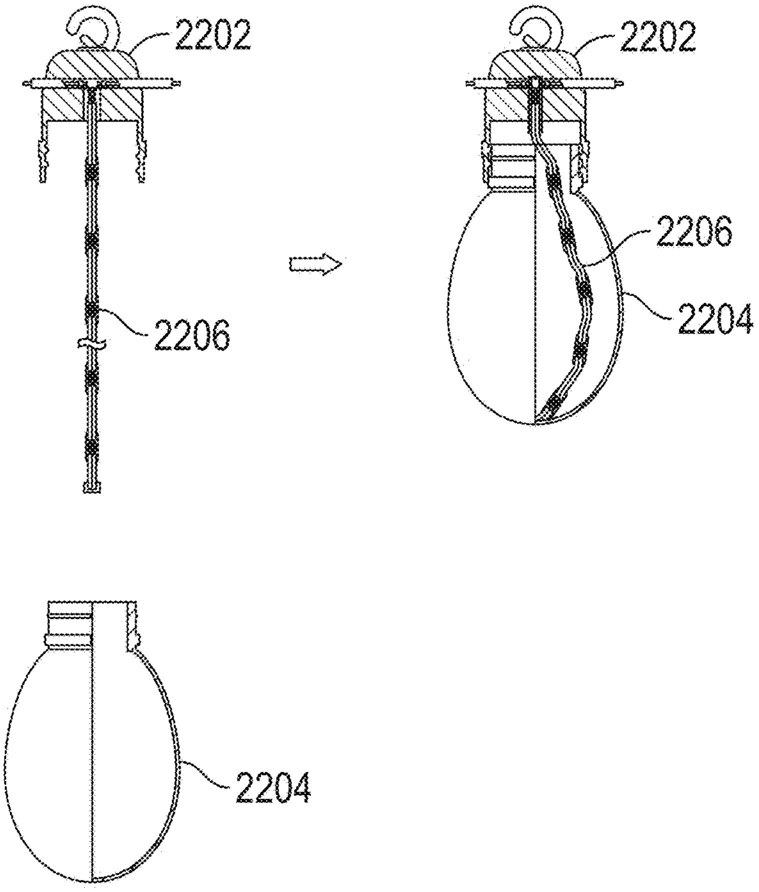

FIG. 22 illustrates another embodiment similar to embodiment illustrated in FIGS. 20 and 21. This embodiment also includes a lamp holder 2202 overmolded directly onto a light source and a decorative shell 2204 assembled onto the lamp holder 2202, enclosing the light source. The difference is that, in this embodiment, the light source is an SMD electric cord light string 2206 instead of the filament LED of the previous embodiment.

Figure 23:
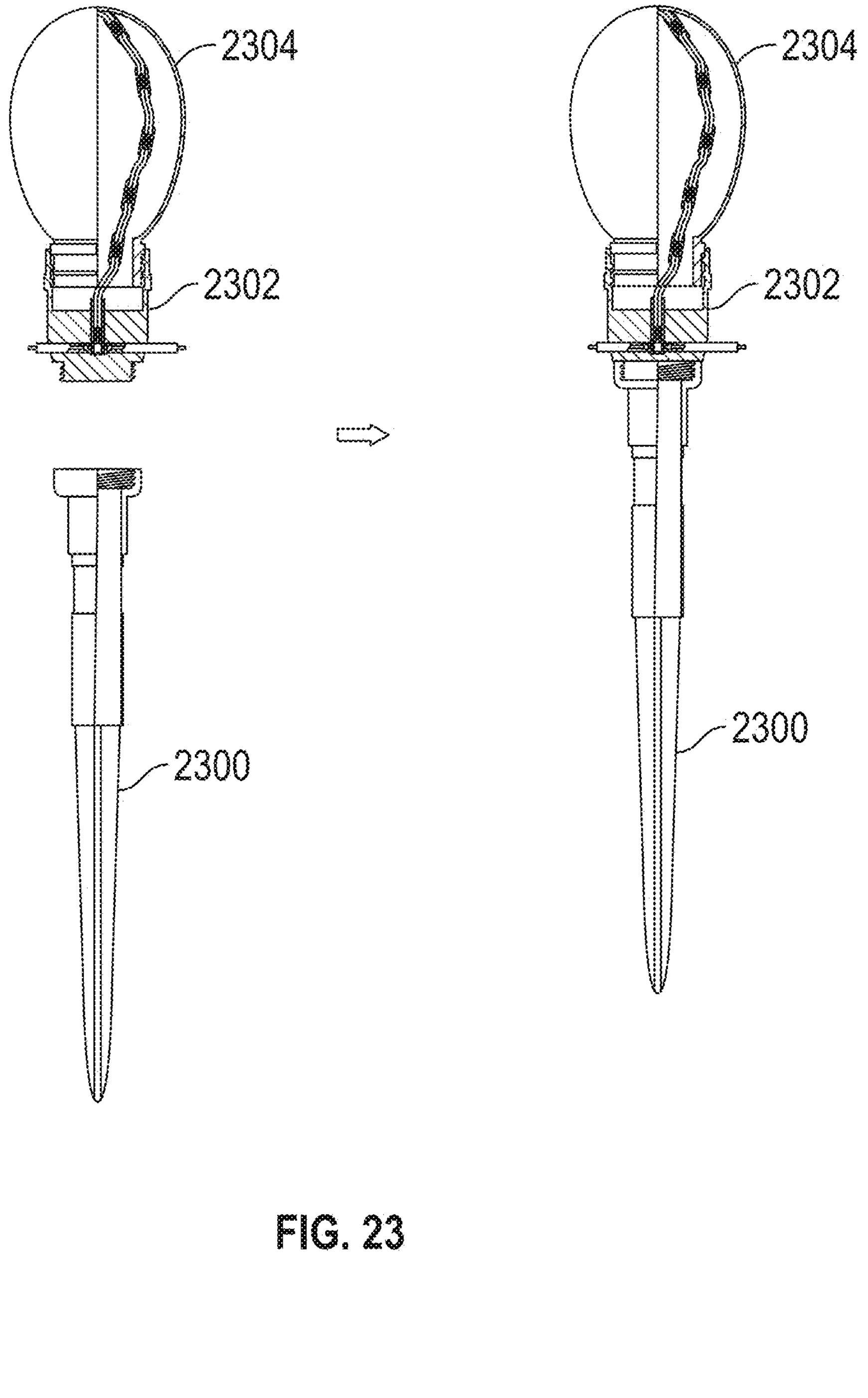

As shown in FIG. 23, a ground stake 2300 can be attached to the end of the lamp holder 2302 that is not attached to a decorative shell 2304 in any of the light assembly discussed in the embodiments above. The ground stake 2300 is for securing the light assembly in the ground.

Figure 24:
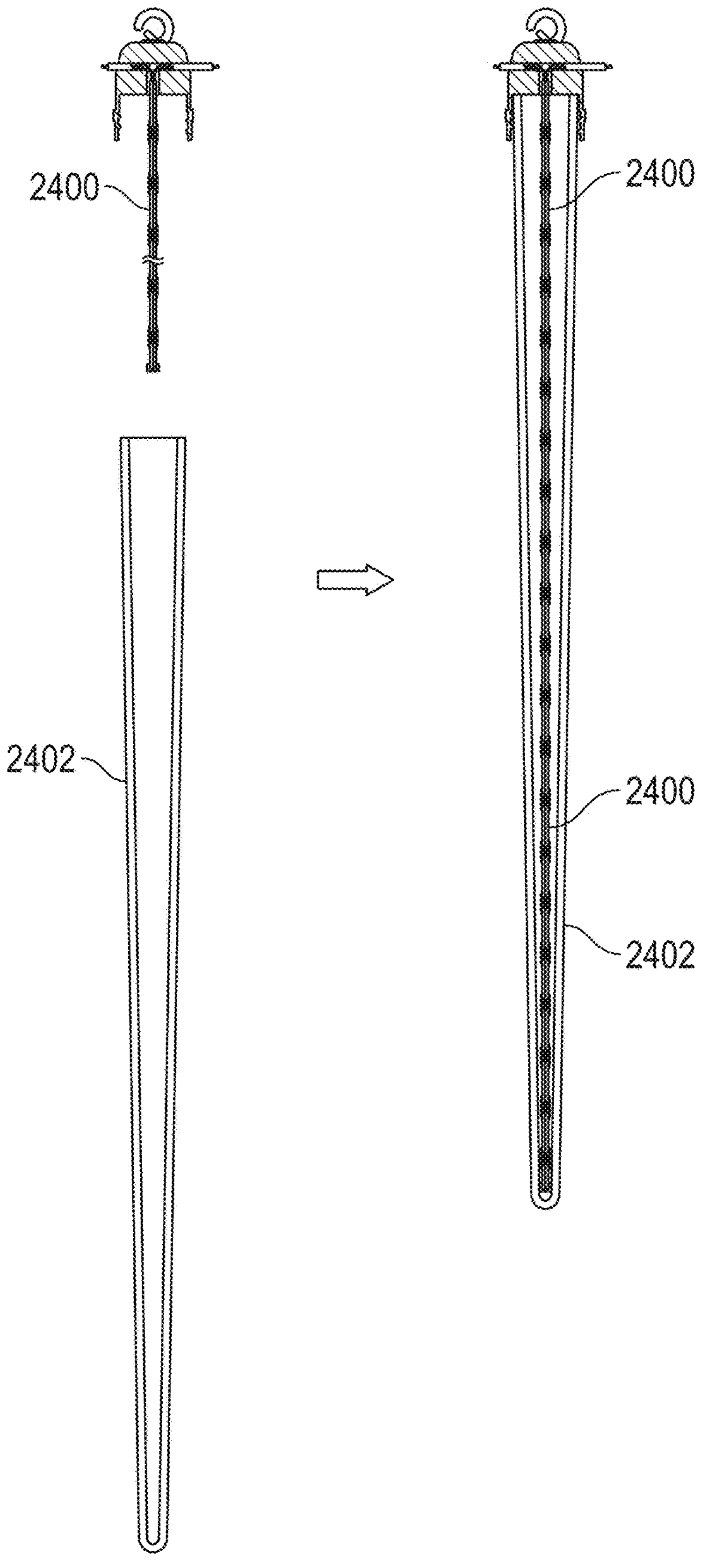

FIG. 24 shows an alternative embodiment to the one shown in FIG. 22. This alternative embodiment can include multiple SMD LED strings 2400 connected in series combined with icicle (or other) shaped decorative shell 2402 to achieve a wide range of applications.

Figure 25:
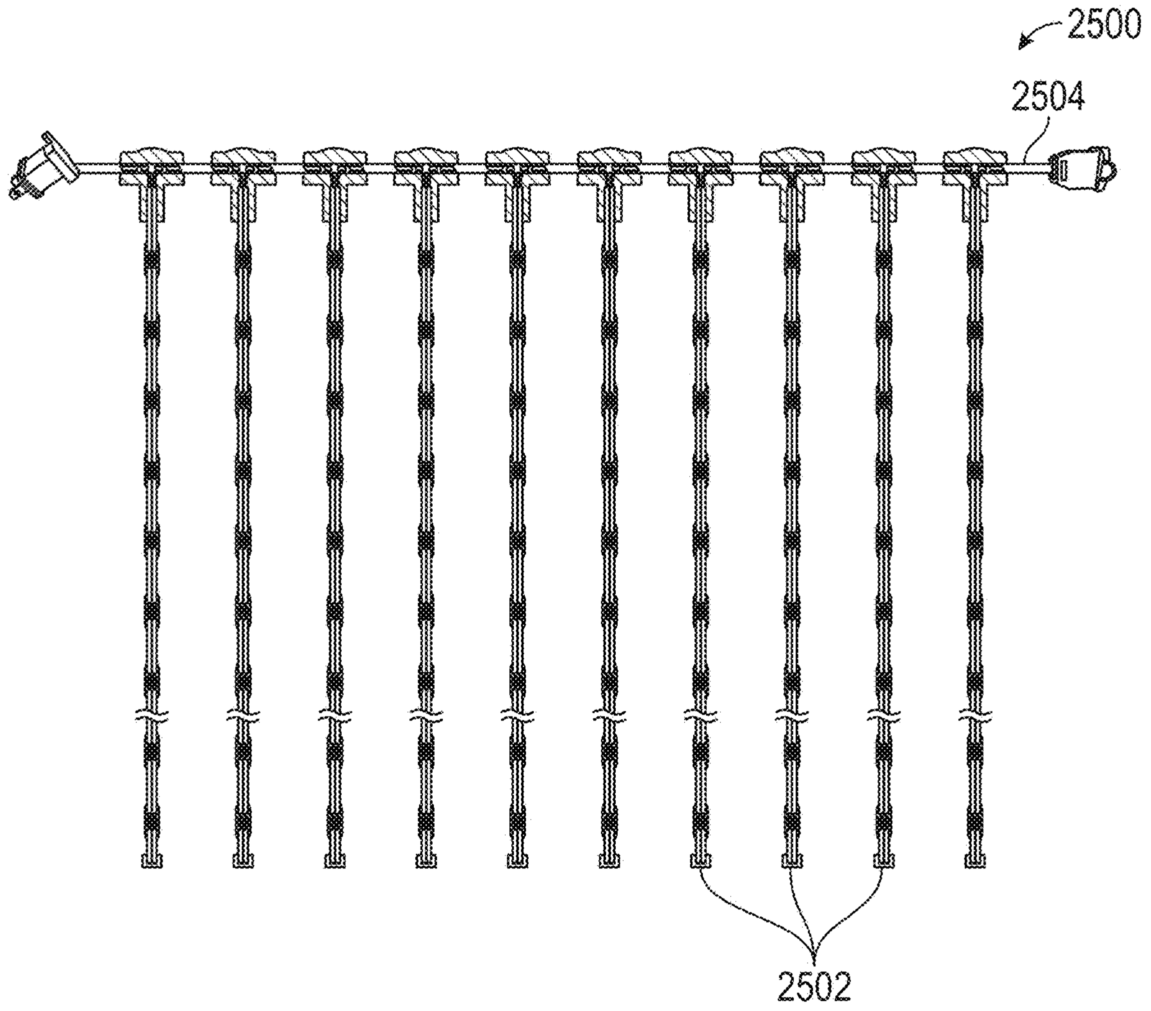

FIG. 25 illustrates an exemplary flexible insulated electric cord light string 2500 with multiple SMD LED strings 2502 all connected to a three-wire flat cable 2504 using the mechanisms disclosed in the embodiments above to create a curtain light effect.

Figure 26:
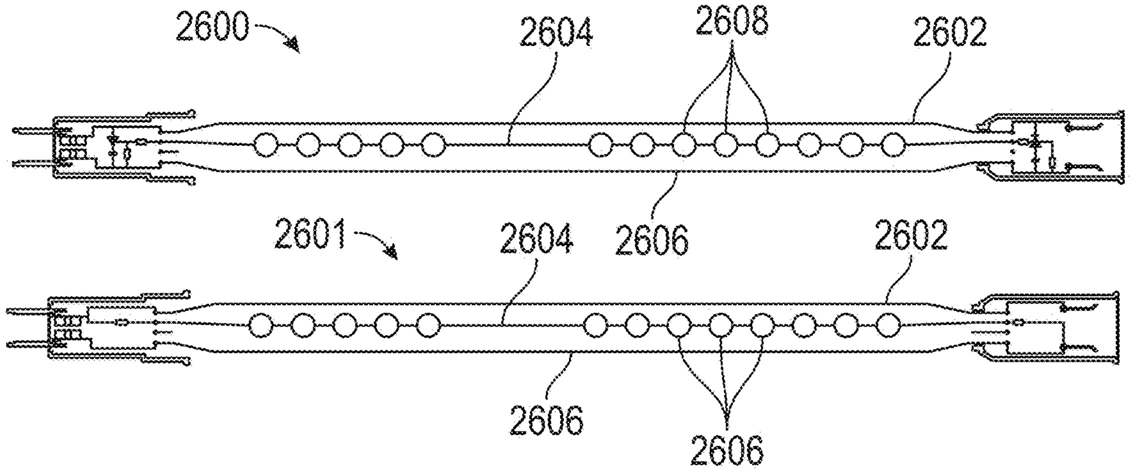
FIG. 26 is a schematic diagram of an exemplary circuit of a light string, according to an embodiment of the disclosure.

FIG. 26 is schematic circuit diagrams illustrating exemplary circuits of the three-wire flat cable light strings of the various embodiments of the disclosure. Each circuit 2600, 2601 shows 3 wires 2602, 2604, 2606 with the middle wire 2604 cut at one or more locations 2608 for connecting to one or more light sources (not shown in FIG. 26).

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method of making a light string comprising:
- providing a three-wire flat cable comprising a middle wire between two outer wires;
- cutting the middle wire at a first place to expose a first end and a second end of the middle wire;
- connecting a light source to the exposed first end and second end of the middle wire;
- inserting a tail cover of a lamp holder to protect the exposed first end and second end of the middle wire;
- wrapping the light source in a heat shrink tube to waterproof the light source;
- securing a lamp head on the tail section of the lamp holder; and
- attaching a decorative shell to the lamp head,
- wherein the tail cover comprises two parallel pieces that each is inserted between the middle wire and one of the outer wires.

2. The method of claim 1, wherein the light source comprises a light emitting diode (LED).

3. The method of claim 1, wherein the light source comprises a filament strip LED.

4. The method of claim 1, wherein the light source comprises a first leg and a second leg; and
- Wherein the first leg and the second leg are riveted to the exposed first end and second end of the middle wire, respectively.

5. The method of claim 1, wherein the light source comprises a two-wire SMD LED light string.

6. The method of claim 1, wherein the parallel pieces of the tail cover extend to cover at least part of the light source.

7. The method of claim 1, further comprising inserting a waterproof accessory inside the lamp head between a flat surface of the three-wire flat cable and the tail piece of the lamp head.

* * * * *